Figure 1:
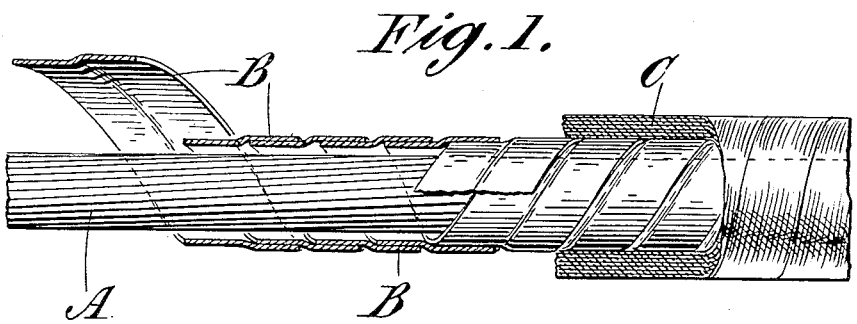
Figure 2:
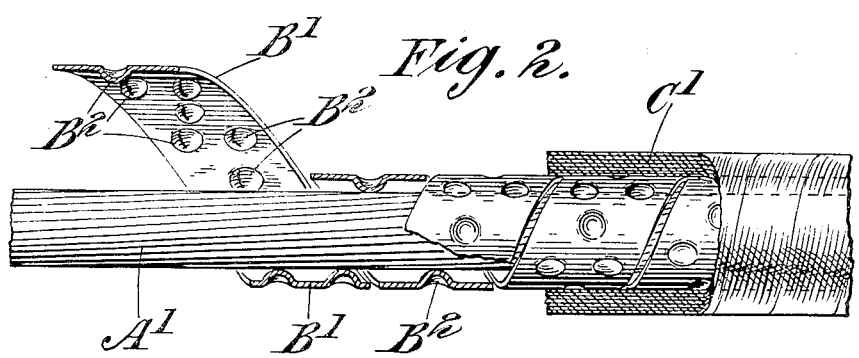
Figure 3:
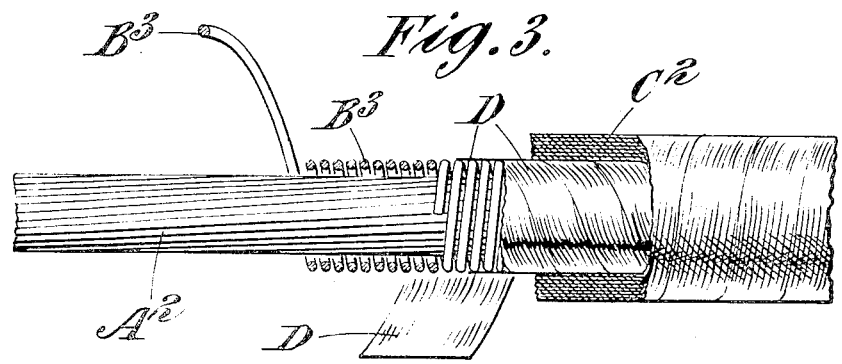
Figure 4:
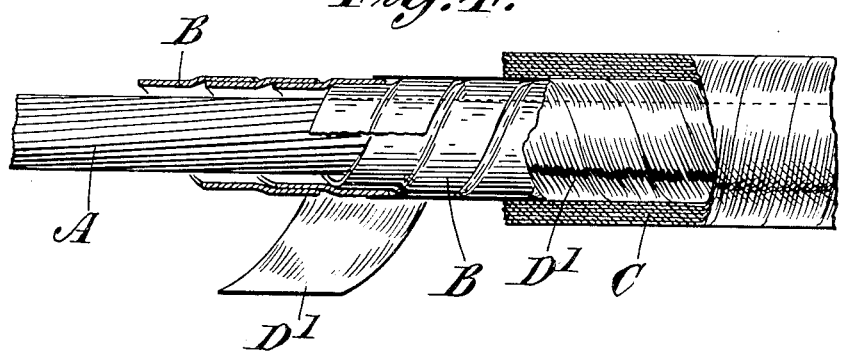
Figure 5:
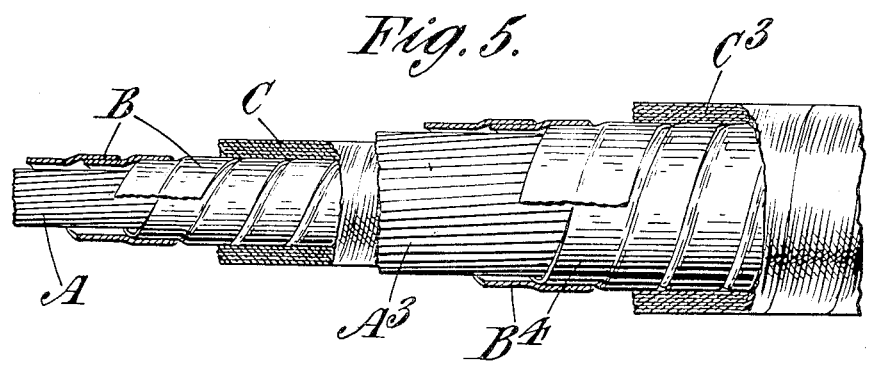
Figure 6:
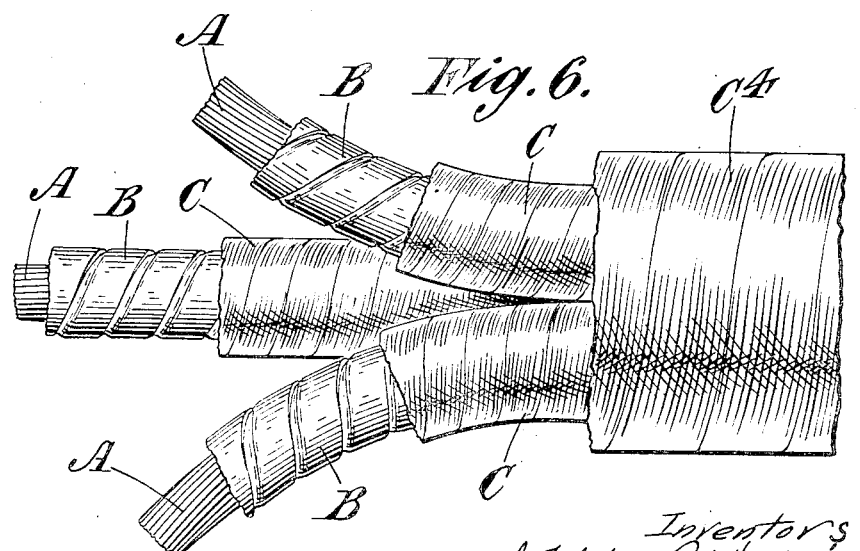

Patented Jan. 14, 1930

1,743,506

UNITED STATES PATENT OFFICE

JOHN FRANCIS WATSON, OF ABBEY WOOD, PHILIP VASSAR HUNTER, OF LONDON, AND ALFRED EDGAR WILSON, OF BROMLEY, ENGLAND

ELECTRIC CABLE

Application filed January 12, 1928, Serial No. 246,291, and in Great Britain April 25, 1927.

This invention relates to electric cables, particularly to high tension cables with one or more insulated conducting cores.

In all cables it is well known that in certain circumstances and from various causes the conductor tends to expand or move relatively to the rest of the cable. Such movement in cables as hitherto constructed is likely to impair the insulation particularly in the case of high tension cables and may cause breakdown.

The object of this invention is the construction of a cable wherein such movement of the conductor may take place without harmful effects.

In an electric cable according to this invention the dielectric is formed with a passage which in the completed cable surrounds or envelops the conductor and is of sufficient size to allow some movement of that conductor.

This passage may be formed in various ways, for instance by a tubular sheath or lapping applied round the conductor as the cable is made, such tubular sheath or lapping being of such diameter and so formed that the paper or other insulation applied outside it will not deform it and cause it to grip the conductor, which is thus left free to move axially and/or radially.

The construction and arrangement of the tubular sheath or lapping is such that there is no injurious relative movement between it and the di-electric.

Such a tubular sheath may, for instance, be of metal and formed of interlocking turns of pressed strip somewhat like the well known flexible tubing for gas or steam. If of metal it is generally desirable that the metal should be non-magnetic, but the tubular sheath may be formed of non-metallic material sufficiently stiff to prevent its deformation by the subsequent insulating wrapping.

In extra high tension cables it is desirable to avoid gaseous ionization, and to this end the tubular sheath may be of conducting material or have its inner surface made conducting in any suitable manner.

The tubular sheath may be made from strip or tape with its edges suitably toothed or otherwise formed so that they engage or interlock to prevent the above mentioned deformation without producing relative motion of the tape and di-electric in a direction along the axis of the conductor.

Again, thin strip may be employed formed on its inner surface with projections or ribs which, although they may touch the conductor, yet present an area of contact so small as not to prevent the desired freedom of movement of the conductor.

Another way of forming the tubular sheath is to enclose the conductor in a helix or helices of wire of suitable crosssectional shape, the internal diameter of the helix being sufficient to allow the movement of the conductor.

When the tubular sheath is so made that its exterior surface is uneven or corrugated as in the case of interlocking flexible tubing, it may be covered with a lapping of foil or like thin material to produce a smooth surface on which the paper or other insulation is laid.

Generally speaking electric cables according to this invention are made with the insulation formed of impregnated paper such as is usual in high tension cables, and the function of the tubular sheath is to form the inner wall of a passage in such insulation, such passage allowing some movement of the conductor within it without having any disturbing or harmful effect on the insulation.

When the tubular sheath is of metal it is desirable in some cases, for instance when the tube has interlocked turns, to employ a metal with a very small coefficient of expansion by heat.

The accompanying drawings are plans with parts removed illustrating portions of electric cables differing in details of construction but all made according to this invention.

In the construction shown in Figure 1 the stranded conductor A is surrounded by a tubular sheath comprising a lapping of strip B applied round the conductor as the cable is made. The turns overlap or interlock